(12) United States Patent
Littleford

(10) Patent No.: US 6,344,177 B1
(45) Date of Patent: Feb. 5, 2002

(54) HEAT RECOVERY AND POLLUTION ABATEMENT DEVICE

(75) Inventor: Wayne Scott Littleford, Nepean (CA)

(73) Assignee: Enviro-Energy Products, Inc. (CA)

( * ) Notice: Subject to any disclaimer, the term of this patent is extended or adjusted under 35 U.S.C. 154(b) by 0 days.

(21) Appl. No.: 09/402,608

(22) PCT Filed: Apr. 22, 1998

(86) PCT No.: PCT/CA98/00363

§ 371 Date: Oct. 22, 1999

§ 102(e) Date: Oct. 22, 1999

(87) PCT Pub. No.: WO98/47604

PCT Pub. Date: Oct. 29, 1998

Related U.S. Application Data

(60) Provisional application No. 60/044,177, filed on Apr. 23, 1997.

(51) Int. Cl.[7] .......................... B01D 47/00; B01D 50/00; C01B 21/00; C01B 17/20
(52) U.S. Cl. .................. 423/210; 423/235; 423/243.01; 422/170
(58) Field of Search .................. 423/235, 243.01, 423/210; 422/170

(56) References Cited

U.S. PATENT DOCUMENTS

| | | | | |
|---|---|---|---|---|
| 3,618,301 A | * | 11/1971 | Handman | 55/259 |
| 3,997,415 A | * | 12/1976 | Machi et al. | 204/157.1 |
| 4,102,982 A | * | 7/1978 | Weir, Jr. | 423/242 |
| 4,158,702 A | * | 6/1979 | Archer | 423/210 |
| 4,189,309 A | * | 2/1980 | Hoekstra | 55/44 |
| 4,213,945 A | * | 7/1980 | Haese et al. | 423/240 |
| 4,590,047 A | * | 5/1986 | Donnelly et al. | 423/242 |
| 4,849,192 A | * | 7/1989 | Lyon | 423/235 |
| 5,122,352 A | * | 6/1992 | Johnson | 423/242 |
| 5,206,002 A | * | 4/1993 | Skelley et al. | 423/235 |
| 5,270,025 A | * | 12/1993 | Ho et al. | 423/235 |
| 5,316,737 A | * | 5/1994 | Skelley et al. | 422/170 |
| 5,321,946 A | * | 6/1994 | Abdelmalek | 60/648 |
| 5,366,708 A | * | 11/1994 | Matros et al. | 423/210 |
| 5,670,122 A | * | 9/1997 | Zamansky et al. | 423/210 |

* cited by examiner

Primary Examiner—Steven P. Griffin
Assistant Examiner—Jonas N. Strickland
(74) Attorney, Agent, or Firm—David E. Rogers; Stuart A. Whittington; Squire, Sanders & Dempsey L.L.P.

(57) ABSTRACT

A heat recovery and pollution abatement process with stackless operation for removing the products of combustion from hot boiler flue gas (45) comprising the steps of passing said hot boiler flue gas through a cloud of steam or mist (46), cooling the hot moist flue gas and recovering the heat therefrom (47), passing the partly cooled hot moist flue gas through a second cloud of mist comprised of cold water to total saturation (48), collecting the resulting stream of acid water, forcing the treated flue gas, mixing the treated flue gas with outside air, directing the forced treated air to atmosphere, shutting off the process in the absence of boiler flue gas.

8 Claims, 11 Drawing Sheets

HEAT RECOVERY AND POLLUTION ABATEMENT DEVICE

Figure 1:
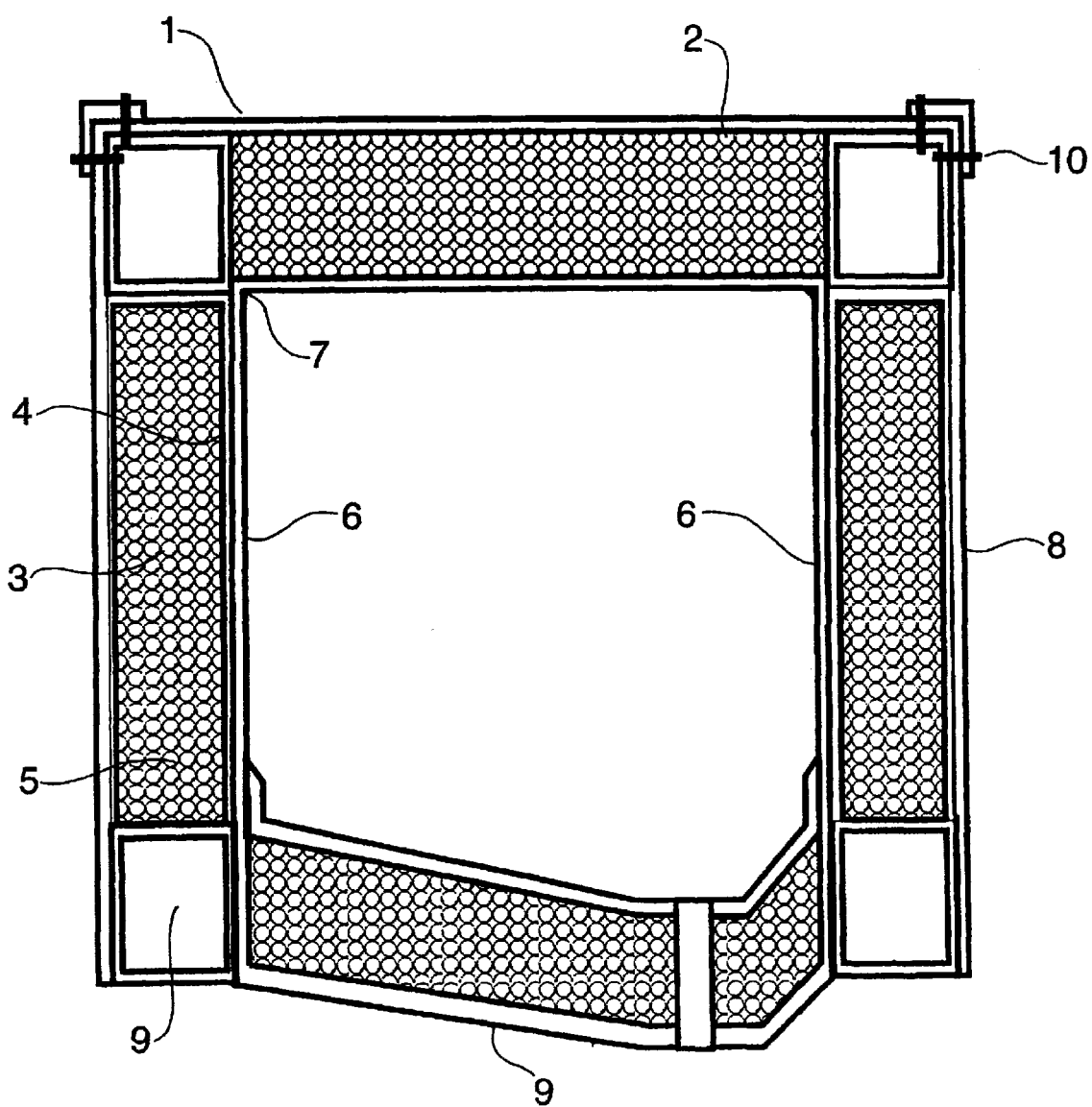

This application is a 371 of PCT/CA98/00363, filed Apr. 22, 1998, and claims benefit of provisional application 60/044,177, filed Apr. 22, 1997.

DESCRIPTION

This invention relates to a pollution abatement process and pollution abatement device which makes use of misting technology, together with cooling and condensation coils to effect targeted pollutants' removal. It accomplishes these objectives with little wastewater generation and the use of reactants for specific pollutants. The invention eliminates the need for an exhaust stack, creating a huge savings for any facility from reduced stack maintenance costs, elimination of stack replacement costs and the elimination of boiler operations for stack warming.

BACKGROUND OF THE INVENTION

General

According to the Principle of Environmental Control (cited by Marks' Standard Handbook of Mechanical Engineers, Ninth edition), nature has provided two almost inexhaustible sumps for maintaining a steady-state environment on earth. The first of these is the 3 K background temperature of absolute space, which nature uses for heat rejection to close its heat balances. The second is the oceans, which serve to close the material balances of its cyclic processes by accepting the combined runoff of the continents. The greatest engineering progress comes when people control their environmental activities so as to take maximum advantage at minimum cost of these sumps and of nature's cyclic process. This is the basic principle upon which the science of environmental control is founded.

Environmental control seeks to subdue and to utilize nature's ecological cycles in order to serve people's needs, thereby conserving natural energy and mineral resources, and to replenish desirable local flora and fauna populations by agriculture and cultivation to provide adequate food, clothing and shelter. Environmental control seeks to extend depletable fuel supplies with clean, abundant forms of reusable energy. Replenishable substitutes for other depletable resources are sought, as well as recycling means for scarce and irretrievable substances. Environmental control seeks to conserve land, air and water quality by diversion into adequately controlled air dispersion and drainage canals of concentrated runoffs. The public standard of living is highest when all these things are done voluntarily by a responsible, cost-conscious citizenry.

Products of Combustion

The combustion byproducts of hydrocarbon fuels primarily consist of nitrogen ($N_2$), carbon dioxide ($CO_2$), water ($H_2O$), carbon monoxide (CO), unburned hydrocarbons (UHC), oxides of sulfur ($SO_x$), particulate (soot) and oxides of nitrogen ($NO_x$).

The last five items, CO, UHC, $SO_x$, particulate and $NO_x$ are unwanted and undesirable. These pollutants are referred to as criteria pollutants and many regulatory agencies around the world have established guidelines for their control.

CO is a gas that is an intermediate product of combustion of hydrocarbon fuels.

UHC often results from poor fuel atomization or quenching of the combustion process by the combustion cooling air film or by high levels of water or steam injection.

Oxides of sulfur are formed when sulfur is present in the fuel during combustion. $SO_x$ forms over a wide range of combustion temperatures and cannot be controlled in the combustion process itself. Hence, $SO_x$ formation either must be prevented from occurring by limiting sulfur in the fuel or else the $SO_x$ that is created must be removed from the exhaust stream by wet scrubbing or sorbent injection.

Particulate matter (i.e. soot or smoke) results from the combustion of liquid fuels/air ratios in the combustion primary zone.

$NO_x$, by virtually unanimous agreement, is considered a primary contributor to visible pollution and deteriorating air quality. The reduction of $NO_x$ has become the major focus of air quality regulations throughout the world in efforts to improve air quality around the world.

PRIOR ART TECHNOLOGIES

The present invention was created based on well known and proven technologies as described below.

Economizers

Economizers remove heat from the moderately low-temperature combustion gases after the gases leave the steam generating and superheating/reheating sections of the boiler unit. Economizers are, in effect, feed water heaters which receive water from the boiler feed pumps and deliver it at higher temperature to the steam generator. Economizers are used instead of additional steam-generating surface, since the feed-water and, consequently, the heat-receiving surface, are at temperatures below the saturated-steam temperatures. Thus, the gases can be cooled to lower temperature levels for greater heat recovery and economy.

Economizers are forced-flow, once through conversion heat transfer devices, usually consisting of steel tubes, to which feed-water is supplied at a pressure above that in the steam generating section and at a rate corresponding to the steam output of the boiler unit, they are classed as horizontal or vertical-tube type, according to geometrical arrangement; as longitudinal or cross flow, depending upon the direction of gas-flow with respect to the tubes;- as parallel or counter flow, with respect to the relative direction of gas and water flow; as steaming or non-steaming, depending on the thermal performance; as return-bend or continuous-tube, depending upon the details of design; and as base-tube or extended-surface, according to the type of heat- absorbing surface. Staggered or in-line tube arrangements may be used. The arrangement of tubes affects the gas flow through the tube bank, the draft loss, the heat transfer characteristics, and the ease of cleaning.

The size of an economizer is governed by economic considerations involving the cost of fuel, the comparative cost and thermal performance of alternate steam-generating or air heater surface, the feed-water temperature, and the desired exit gas temperature. In many cases, it is more economical to use both an economizer and an air heater.

Present day practice in individual independent economizers is to install economizers having a surface from 50 to 70% of the boiler heating surface. The main factor affecting heat transfer rates is the gas velocity over the economizer. With the ordinary economizers with gas velocities corresponding to approximately 1500 lb. of gas per square foot (71.700 $N/m^2$) of gas passage area per hour through the economizers a transfer rate from 2.5 to 3.0 B.T.U. (2.65 kJ to 3.18 kJ) per hour per square foot (0.09 $m^2$) of surface per ° F. (0.56° C.) difference in temperature may be expected. If this velocity is increased to 3000 lb. (143,400 $N/m^2$) per hour the rate will be from 3.5 to 4.5 B.T.U. (3.71 kJ to 4.77 kJ). Gas velocities through steel economizers are not high and transfer rates are low. With the latest designs of steel tube economizers where the counter flow principle is used, gas velocities are higher and heat transfer rates with this type of economizer will vary from 4 B.T.U. to 8 B.T.U. (4.24 to 8.48 kJ) at 300% of rating.

With the amounts of economizer surface ordinarily installed, the increase in boiler efficiency may be taken as 1% for each 10% of the boiler surface in the economizer at different ratings, and 1.4% for each 10% of surface at 300% of boiler rating.

The installation of economizers necessitates the use of an induced draft fan to overcome the increased draft resistance and also because of the reduction in gas temperatures. The draft loss due to an economizer is usually from 40 to 60% of the loss through to boiler to which it is attached. There are two types of flue gas economizers on which we based our theories: wet scrubber technology and flue gas to hydronic technology.

(i) Wet Scrubber Technology

Wet scrubbers or what is called static spray scrubbers are usually of the tower type, the gas passing upward counter-currently to the descending liquid. Sets of sprays are placed in the top zone, with various materials used in layer to channel and mix the gas and water. Hurdles, cylindrical tiles, and random packed ceramic tiles or metal spirals are common packing materials. With a gas flow-rate of about 350 ft$^3$/min per ft$^2$ (9.9 m$^3$/min per 0.1 m$^2$) of cross-sectional area and a water rate of 25 gal per Mcf (95 L per 28.3 m$^3$) of gas, a cleanliness of 0.1 to 0.3 gr/ft$^3$ (3.5 to 10.6 g/m$^3$) can be obtained with blast furnace, cook oven, and producer gas. The pressure drop through a tower scrubber is in the range of 4 to 10 in. W.G. (7.5 mm Hg to 18.7 mm Hg). The scrubber process is used as the primary cleaning and cooling stages before the cleaning of gases. After scrubbing the gases the water droplets, by gravitational force empty into a steel reservoir at the bottom of the tower. Because of the acids that have been formed in the water, a separate non-metallic piping system is installed with pumps, chemical treatment system and exchangers to circulate a low grade heat (approx. 120° F. (48.80° C.) to be used on existing heating equipment.

(ii) Flue Gas to Hydronic Technology

Conventional-type super heaters are installed by the boiler exit where the gas temperatures are lower than those in the zones where radiant-type super heaters are used. The tubes are usually arranged in the form of parallel elements on close lateral spacing and in tube banks extending partially or completely across the width of the gas stream, with the gas flowing through the relatively narrow spaces between the tubes. High rates of gas flow and, thus, high conventional heat-transfer rates are obtained at the expense of gas-pressure drop through the tube bank.

Super heaters, shielded from the boiler combustion zone by arches of wide-spaced screens of tubes, which receive heat by radiation from the high-temperature gases in cavities or inter tube spaces and also by convection due to the relatively high rate of gas flow through the tube banks, have both radiant and convection characteristics. Super heaters may utilize tubes arranged in the form of hairy loops connected in parallel to inlet and outlet headers; or they may be of continuous-tube type, where each element consists of a number of tube loops in series between the inlet and outlet headers. The latter arrangement persists the use of large tube bank, thus increasing the amount of heat-absorbing surface that can be installed and providing economy of space and reduction cost. Either type may be designed for the drainage of the condensate which forms within the tubes during outages of the unit. Both types require that every tube have sufficient internal fluid flow to prevent overheating during operation. The heat transferred from high-temperature gases by radiation and convection is conducted through the metal tube wall and imparted by convection to the high-velocity liquid or vapour in the tubes. The removal of heat by the liquid or vapour is necessary to keep the tube metals within a safe temperature range consistent with the temperature limits of oxidation and the creep or rupture strength of the materials. Allowable design stresses for various steels and alloy are established by the A.S.M.E. (American Society of Mechanical Engineers) code. For economic reasons, it is customary to use low-carbon steel in the inlet sections of the super heater, and, progressively, more costly alloys as the metal temperatures increase.

The rate of liquid or vapour flow through the tubes must be sufficiently high to keep the metal temperature within a safe operating range and to ensure good distribution of flow through all the elements connected in parallel circuits. This can be accomplished by arrangements which provide for multiple passes of liquid or vapour flow through the tube banks. Excessive liquid or vapour flow rates, while providing lower tube-metal temperatures, should be avoided, since they result in high pressure drop with consequent loss of thermodynamic efficiency. The spacing of the tubular elements in the tube bank and, consequently, the rate of gas flow and convection heat transfer are governed primarily by the types of fuel fired, draft loss considerations, and the fouling and erosive characteristics of fuel carried in the gas stream.

Fundamental Principles of Combustion

Combustion may be defined as that chemical process in which an oxidant is reacted rapidly with a fuel to liberate stored energy as thermal energy, generally in the form of high temperature gases. Small amounts of electromagnetic energy (light), electric energy (free ions and electrons), and mechanical energy (noise) are also released during the combustion process. Except for special applications, the oxidant for combustion is oxygen in the air.

Conventional hydrocarbon fuels contain primarily hydrogen and carbon, either in the elemental forms or in various compounds. Complete combustion of these fuel elements produces primarily carbon dioxide and water. However, small quantities of carbon monoxide and partially reacted flue constituents in the form of gases and liquid or solid aerosols may also form. Most conventional fuels also contain small quantities of sulfur, which is oxidized to $SO_2$ or $SO_3$ during the formation of mineral matter (ash), water, and inert gases which are released during the combustion process.

The rate at which a fuel is combusted is dependent on:
(1) the reaction rate of the combustible fuel constituents with oxygen;
(2) the rate at which oxygen is supplied to the fuel (mixing of air and fuel); and
(3) the temperature in the combustion region.

The reaction rate is fixed by the selection of the fuel. Increasing either the mixing rate or the temperature will increase the rate of combustion.

Complete combustion of hydrocarbon fuels is obtained when all of the hydrogen and carbon in the fuel is oxidized to water and carbon dioxide. Generally, to obtain complete combustion it is necessary to supply excess oxygen, or excess air, beyond that theoretically required to oxidize the fuel. Excess oxygen or excess air is usually expressed as a percentage of the air theoretically required to completely oxidize the fuel.

Stoichiometric combustion of a hydrocarbon fuel occurs when fuel is reacted with the exact amount of oxygen required to oxidize al of the carbon, hydrogen, and sulfur in the fuel to carbon dioxide, water and sulfur dioxide. Hence, the exhaust gas from stoichiometric combustion would contain no incompletely oxidized fuel constituents or oxygen. The percentage of carbon dioxide contained in the products of stoichiometric combustion is the maximum attainable and is referred to as the stoichiometric $CO_2$, ultimate $CO_2$, or maximum theoretical percentage of carbon dioxide.

Stoichiometric combustion, that is, combustion at zero excess oxygen without the formation of incompletely combusted fuel products, is seldom realized in practice. The need for economy and safety dictates that most types of combustion equipment must operate with some excess air. This assures that fuel is not wasted and that the combustion equipment will be sufficiently flexible in performance to provide complete combustion despite variations in fuel properties and in the rate in which fuel and air are supplied.

Combustion Reactions

Combustion reactions of oxygen with combustible elements and compounds in fuels occur in accordance with fixed chemical principles.

Oxygen required for combustion is normally obtained from air, which is a mechanical mixture of nitrogen and oxygen with small amounts of water vapour, carbon dioxide, and inert gases. For practical combustion calculations, it is considered that dry air consists of 20.95% oxygen and 79.05% inert gases (including nitrogen, argon etc.) by volume, or 23.15% oxygen and 76.85% inert gases by weight. For purpose of calculations, it is assumed that nitrogen passes through the combustion process unchanged, although it is known that small quantities of nitrogen oxides do form.

Combustion Calculations

Calculations of the quantity of air required for combustion and the quantity of flue gas products generated during combustion are frequently needed for sizing system components and as an input to efficiency calculations. Other calculations, such as values for excess air and theoretical $CO_2$ are useful in estimating combustion system performance. Frequently, combustion calculations can be simplified by using molecular weight as the basis for the calculations. Molecular weights may be expressed in any units of weight. Thus, in English units, the pound molecular weight, or pound mole, is frequently used where the pound molecular weight of a compound is equal to the molecular weight of the compound expressed in pounds. A pound molecular weight of any substance contains the same number of molecules as a pound molecular weight of any other substance.

Corresponding to measurement standards common to the industries, calculations involving gaseous fuels are generally made on a volume basis, while calculations involving liquid and solid fuels are generally made on a weight basis.

Air Required for Combustion

Stoichiometric air or theoretical air is the exact quantity of air required to provide oxygen for complete combustion. The three most prevalent components in hydrocarbon fuels are completely combusted by the following reactions:

$C+O_2 \rightarrow CO_2$ $H_2+0.5O_2 \rightarrow H_2O$ $S+O_2 \rightarrow SO_2$

C, $H_2$, S and O in the above reactions can be taken to represent 1 lb. (1 kg) mole of carbon, hydrogen, sulfur and oxygen, respectively. Using approximate atomic weights (C=12, H=1, S=32 and O=16), it is seen that 12 lb. (12 kg) of carbon are oxidized by 32 lb. (32 kg) of oxygen to form 44 lb. (44 kg) of $CO_2$; 2 lb. of hydrogen are oxidized by 16 lb.(16 kg) of oxygen to form 18 lb. (18 kg) of water; and 32 lb. (32 kg) of sulfur are oxidized by 32 lb. (32 k) of oxygen to form 64 lb. (64 kg) of sulfur dioxides. These relationships can be extended to include other hydrocarbon compounds. The weight of dry air required to supply a given quantity of oxygen is 4.32 times the weight of the oxygen. The weight of oxygen or of air required to oxidize the fuel constituents were calculated based on standard tables (combustion reactions of common fuel constituents). Oxygen contained in the fuel, except that contained in ash, should be deducted from the quantity of oxygen required as this oxygen is already combined with fuel components. However, water vapour is always present in atmospheric air, and when the weight of air to be supplied for combustion is calculated, allowance should be made for water vapour.

As stated previously, combustion calculations are sometimes made on volumetric basis. Based on Avogdro's Law, it can be shown that, for any gas, 1 lb. (1 kg) mole occupies the same volume, at a given temperature and pressure. Therefore, in reactions involving gaseous compounds, the gases react in volume ratios identical to the pound mole ratios. That is, for the oxidation of hydrogen in the above reaction, one volume (or 1 lb. (1 kg) mole) of hydrogen reacts with ½ volume (or ½ lb. (1/2 kg) (mole) of oxygen to form one volume (or 1 lb. (1 kg) mole) of water vapour. The volume of air required to supply a given volume of oxygen is 4.79 times the volume of oxygen. The volumes of oxygen or of dry air required to oxidize the fuel constituents were calculated based on standard tables. Volume ratios were not given for fuels that do not exist in the vapour form at reasonable temperatures or pressures. Oxygen contained in the fuel should be deducted from the quantity of oxygen required, as this oxygen is already combined with fuel components. Allowance should be made for the water vapour which increases the volume of dry air by 1 to 3%. From the above relationships, the weight of dry air required for stoichiometric combustion of any hydrocarbon fuel may be obtained by the equation:

Pounds (kilograms) of dry air per pound (per kg) of Fuel=
0.0144(8C+24H+3S−3O)

where C, H, S and O are the weight percentages of carbon, hydrogen, sulfur and oxygen in the fuel respectively. Analyses of gaseous fuels are generally reported on the basis of hydrocarbon components rather than on elemental content.

Quantity of Flue Gas Produced

The weight of dry flue gas produced per pound (kg) of fuel burned is required in heat loss and efficiency calculations. The weight of flue gas per pound (kg) of fuel is equal to the sum of the weight of fuel (minus ash retained in furnace), the weight of air theoretically required for combustion and the weight for excess air. For solid fuels the weight of flue gas produced may be determined from the flue gas analysis by:

Pounds (kg) of dry flue gas, per pound (kg) of fuel $$\frac{11 CO_2 + 8 O_2 + 7(CO + N_2) \times C}{3(CO_2 + CO)}$$

Values for $CO_2$, $O_2$, CO, and $N_2$ are percentages by volume from the flue gas analysis, and C is the weight of carbon burned per pound of fuel. Total dry gas volume of flue gases resulting from the combustion of one cubic foot (1 m³) of gaseous fuels for various percentages of $CO_2$ may be determined by:

Dry flue gas, cubic feet per cubic foot ($m^3$ per $m^3$) of fuel gas =

$$\frac{\text{Cubic feet } (m^3)\ CO_2 \text{ produced per cubic foot } (m^3) \text{ of gas burned} \times 100}{\text{Percent } CO_2 \text{ by analysis}}$$

The excess air quantity may then be determined by subtracting the quantity of dry flue gases which would result from stoichiometric combustion from the total volume of flue gas.

Sample Combustion Calculation

Applications of the preceding equations are illustrated by Examples 1 and 2.

EXAMPLE 1

The analysis of the flue gases resulting from the burning of a natural gas is 10.0% $CO_2$, 3.1% $O_2$ and 86.9% $N_2$ by volume. The analysis of the fuel is 90% $CH_4$, 5% $N_2$ and 5% $C_2H_6$ by volume. To find U (the maximum theoretical percent $CO_2$), and the percent of excess air:

$$\text{Solution } U = \frac{10.0}{1 - \frac{(3.1)}{21}} = 11.74\%\ CO_2$$

Excess air percent = $\frac{(11.8 - 10.0) \times 90}{ } = 15.7$

Excess air percent=(11.8−10.0)×90=15.7

EXAMPLE 2

For the analysis in Example 1 find, per cubic foot (per $m^3$) of fuel gas, the cubic feet ($m^3$) of dry air required for combustion, the cubic feet ($m^3$) of each constituent in the flue gases, and the total volume of dry and wet flue gases.

The volume of dry air required for combustion is:

(9.57)($CH_4$)+(16.75)($C_2H_6$)=9.57×0.90+16.75×0.05=9.45 cu.ft/cu.ft($m^3/m^3$)gas The constituents per cubic foot (per $m^3$) of flue gas are:

| | |
|---|---|
| Nitrogen, $N_2$: | |
| From methane = (0.9 $CH_4$)(9.57 − 2.0) | = 6.81 |
| From ethane = (0.05 $C_2H_6$)(16.75 − 3.5) | = 0.61 |
| Nitrogen in fuel = | = 0.05 |
| Nitrogen in excess air = 0.791 × 0.14\57 × 9.45 | = 1.17 |
| Total nitrogen | 8.64 cu. ft. (0.24 $m^3$) |
| Oxygen, $O_2$: | |
| Oxygen in excess air = 0.209 × 0.157 × 9.45 | = 0.31 cu ft. (0.009 $m^3$) |
| Carbon dioxide, $CO_2$: | |
| From methane = (0.9 $CH_4$)(1.0) | = 0.90 |
| From ethane = (0.05 $C_2H_6$)(4.0/2.0) | = 0.10 |
| Total carbon dioxide | 1.00 cu. ft. (0.03 $m^3$) |

Total Water Vapour

Total volume of dry gas per cubic foot (per $m^3$) of gas:

8.64+0.31+1.00=9.95 cu.ft. (0.28 $m^3$)

Total volume of wet gases per cubic foot (per $m^3$) of gas (neglecting water vapour in combustion air)

9.95+1.95=11.90 cu.ft. (0.357 $m^3$)

The cubic feet of dry flue gas per cubic foot (per $m^3$) of fuel gas that may also be computed from equation is as follows:

(1.00)(100)/10.0=10 cu. ft (0.28 $m^3$)

Combustion of Gaseous and Liquid Fuels

Combustion equation is the approximate molecular weights of the important elements and compounds entering into the combustion calculations. For the elements C and H, the equations of complete combustion are:

$C+O_2=CO_2\ \ H_2+½O_2=H_2)$ 12 lb+32 lb=44 lb  21 lb+16 lb=18 lb (12 kg+32 kg=44 kg) (2 kg+16 kg=18 kg)

For a combustible compound, as $CH_4$ the equation may be written as:

$CH_4+XO_2=y\ CO_2+2H_2O$

Taking, as a basis, 1 molecule of $CH_4$ and making a balance of atom on the two sides of the equation, it is seen that:

y=1z=2  2x=2y+z  or  x=2

Hence, $CH_4+2O_2=CO_2+2H_2O$ 16 lb+64 lb=44 lb+36 lb (16 kg+64 kg=44 kg+36 kg)

The coefficients in the combustion equation give the combining volumes of the gaseous components. Thus, in the last equation $1 ft^3$ (1 $m^3$) of $CH_4$ requires for combustion $2ft^3$ (2 $m^3$) of oxygen and the resulting gaseous products of combustion are 1 $ft^3$ (1 $m^3$) of $CO_2$ and 2 $ft^3$ (2 $m^3$) of $H_2O$. The coefficients multiplied by the corresponding molecular weights give the combining weights. These are conveniently referred to 1 lb (1 kg) of the fuel. In the combustion of $CH_4$ for example, 1 lb (1 kg) of $CH_4$ requires 64/16=4 lb (4 kg) of oxygen for complete combustion and the products are 44/16=2.75 lb (2.75 kg) of $CO_2$ and 36/16=2.25 lb (2.25 kg) of $H_2O$.

Air Required for Combustion

The composition of air is approximately 0.232 $O_2$ and 0.768 $N_2$ on a pound (kilogram) basis, or 0.21 $O_2$ and 0.79 $N_2$ by volume. For exact analyses, it may be necessary sometimes to take account of the water vapour mixed with the air, but ordinarily this may be neglected. The minimum amount of air required for the combustion of 1 lb (1 kg) of fuel is the quantity of oxygen required, as found from the combustion equation, divided by 0.232. Likewise, the minimum volume of air required for the combustion of 1 $ft^3$ (1 $m^3$) of a fuel gas is the volume of oxygen divided by 0.21. For example, in the combustion of $CH_4$ the air required per pound (per kg) of $CH_4$ is 4/0.232=17.24 lb (17.24 kg) and the volume of air per cubic foot (per $m^3$) of $CH_4$ is 2/0.21=9.52 $ft^3$ (9.52 $m^3$). Ordinarily, more air is provided than is required for complete combustion.

DESCRIPTION OF THE PRESENT INVENTION

The steps in the process and components of the unit of the present invention involve a process and a unit applying economizers' theories pertaining to (1) flue gas to hydronic technology for maximum heat recovery and (2) wet scrubber technology for maximum pollution control.

The process and unit are engineered and designed to accommodate any type of flue gas streams generated by combustible fuels such as natural gas, light oil, heavy oil, sewage gas, etc. Also the process and unit can be used on process air or gas such as paint fumes, formaldehyde and any type of fume arising from internal manufacturing. The process and unit can be designed to be used on cleaning indoor polluted ambient air, cleaning indoor exhaust air and/or to supply clean fresh controlled air to the inside of buildings for human consumption.

The process and unit of the present invention are designed with a first misting chamber, cooling coil, a second misting chamber, condensing coil, a fan, a diffuser, a treated flue gas outlet unit with dampers and built-in automated direct digital control modules as described in detail below.

IN THE DRAWINGS

FIG. 1 illustrates the unit casing (1) comprised of component modules of insulated sectionalized, gauge, milled stainless steel and galvanized steel to form sandwich panels (2) with reinforced external channels. The media between the panels (3) is incombustible thermal acoustic, shot free glass fiber insulation with long resilient fibers bonded with thermosetting resin. Thickness (4) is 4" (10 cm) that is compressed less than 5% during panel assembly. Insulation (5) is bacteria and fungus resistant, resilient so that it will not crumble or break, conforms to irregular surfaces and returns to full thickness if compressed and corrosion resistant so that it does not cause or accelerate corrosion of aluminum or steel. The media (3) has the required fibre properties as rated by the underwriters' laboratories or better. The internal skin (6) is constructed of 12 gauge (6.4 mm), 316L stainless steel, welded (7) water tight to withstand high temperatures and moisture conditions. The exterior skin (8) is constructed of 16 gauge (2.4 mm) pre-galvanized sheet steel and is etched, epoxy coated and finished with durable enamel paint. The structural frame (9) is constructed from 4"×4"×0.187 (102× 102×5 mm) HSS with all cut edges within the unit for proper secure welded joints and/or bolt fixings (10). The thickness and composition of materials used may change from one application to another.

Figure 2A:
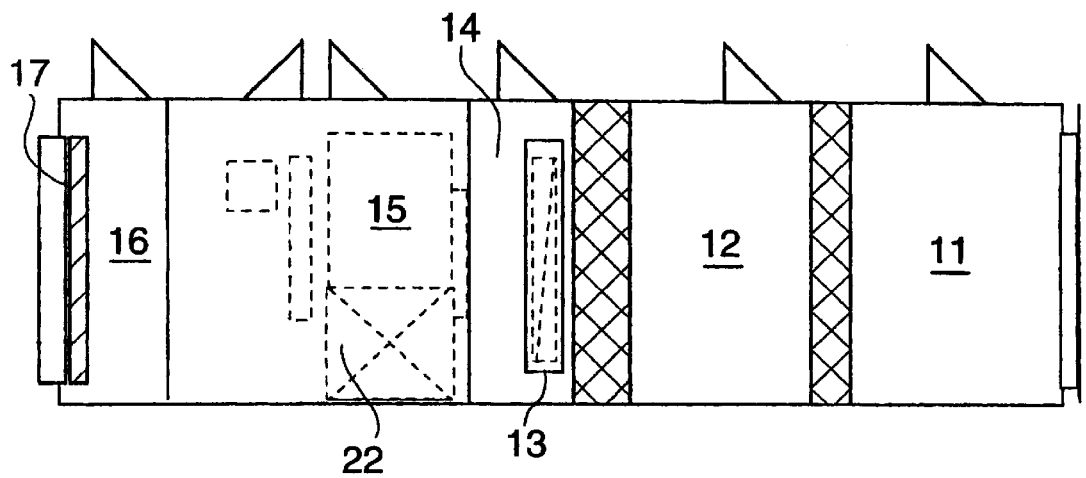
Figure 2B:
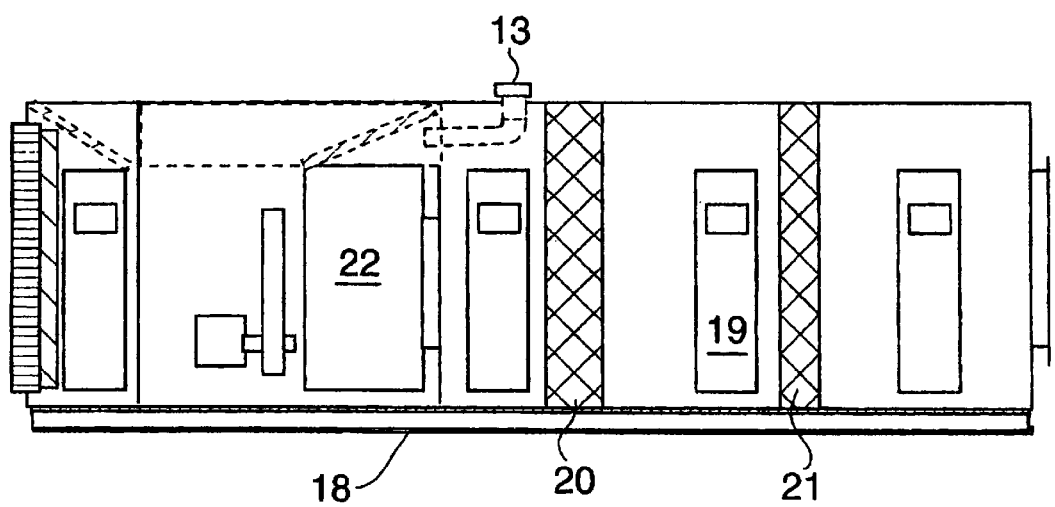
Figure 5:
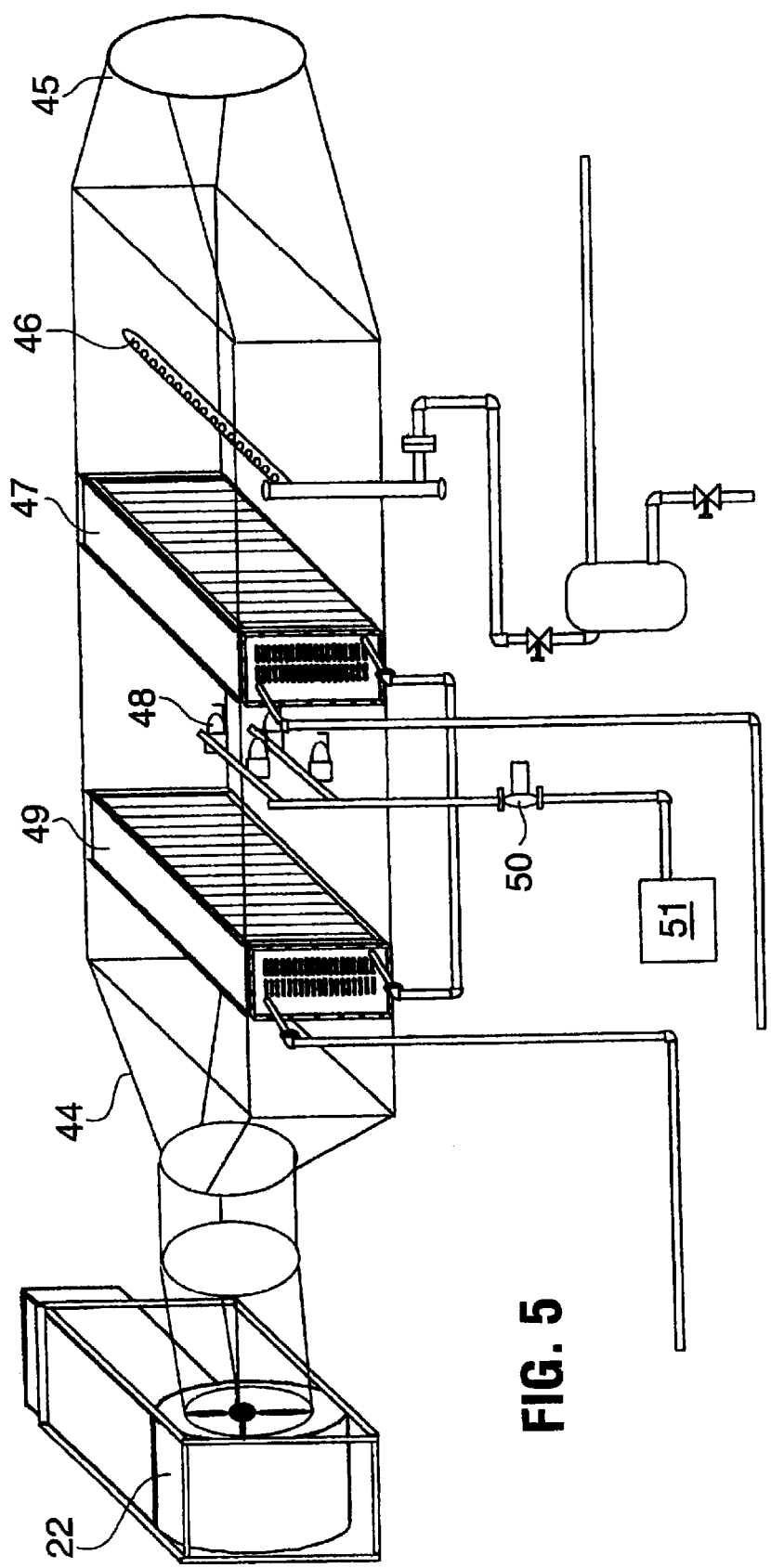
Figure 8:
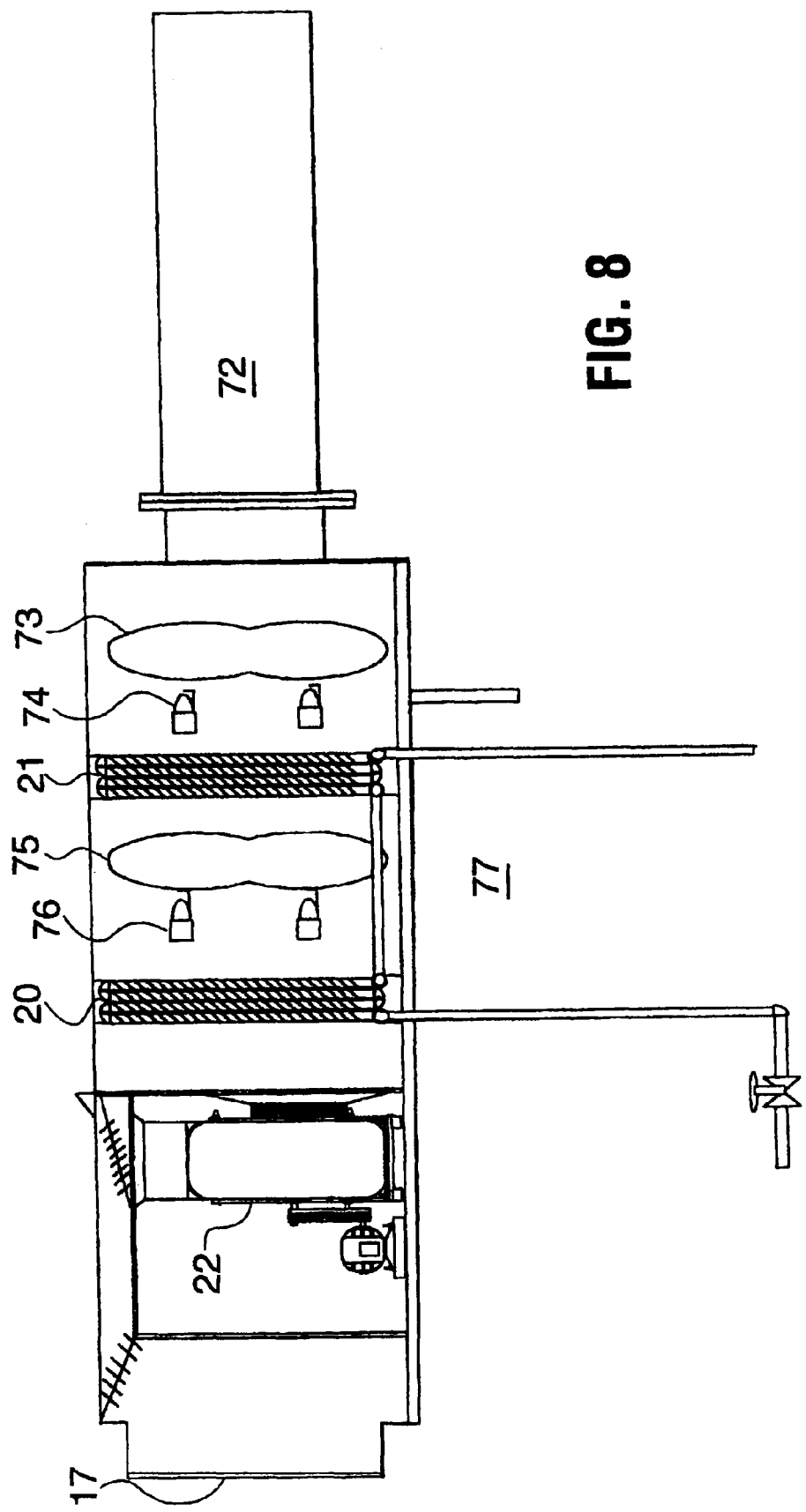

FIGS. 2A and 2B illustrate a top-view and side-view of the unit which is built up from modular components, thus allowing units to be fitted and sized exactly to customers' specifications. The first compartment (11) is fitted with a misting device consisting of a series of saturation vapour nozzles completed with piping and fittings as shown in FIGS. 5 and 8. The second compartment (12) is fitted with a second string of saturation vapour nozzles also complete with piping and fittings as shown in FIG. 5. The top of the third compartment (13) has a design built diffuser configuration to allow outdoor ambient air to be mixed with the saturated exhaust air from the powered fan (22) in the third compartment (14) at approximately 20 to 1 ratio. The fourth compartment (15) houses a powered fan (22) to meet the requirements of the flue gas appliance to which the unit is connected. The fifth compartment (16) is the exit end of the unit where the flue gas now is cleaned and ready to disperse into the atmosphere. There is a specially designed discharge damper (17) which through automatic controls modulates and directs the clean exhaust out of the unit. The side-view shows there is a structural channel base (18) on which the modular unit sits, with continuous drain pan (not shown) welded to channel backs and fan suction bulkhead. There is a series of doors with looking glass (19) so that each individual component has easy maintenance access. A condensing coil (20) is installed between the third compartment (13) and the second compartment (12), and a cooling coil (21) is installed between the second compartment (12) and the first compartment (11).

Figure 3A:
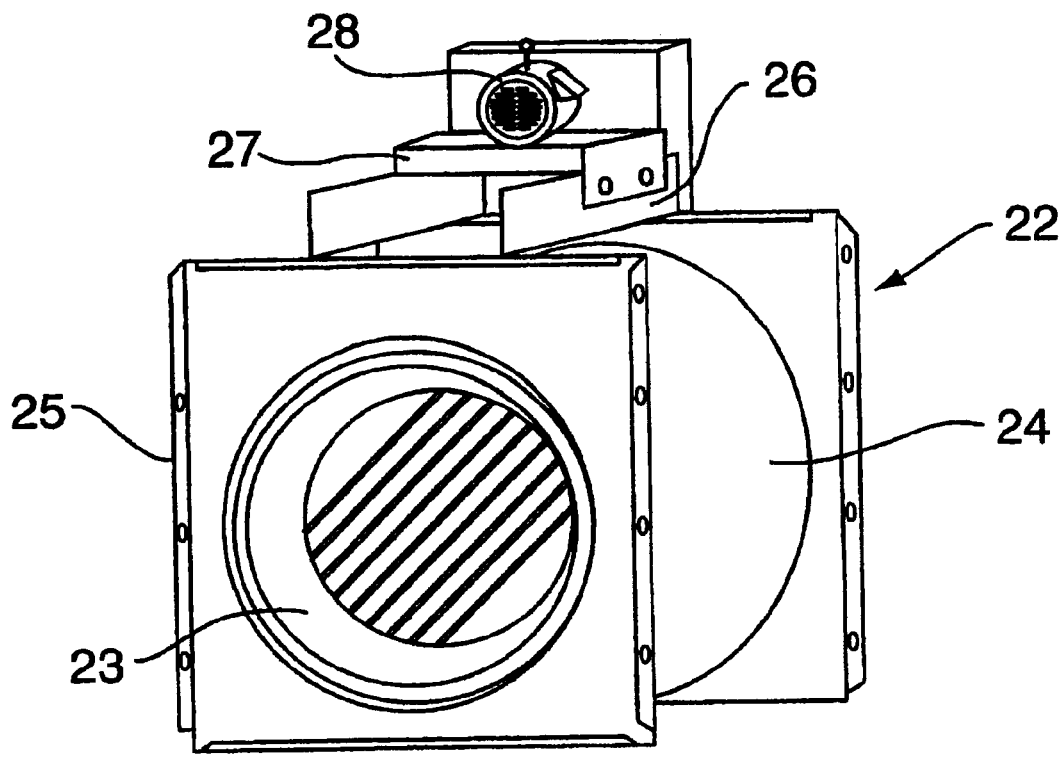
Figure 3B:
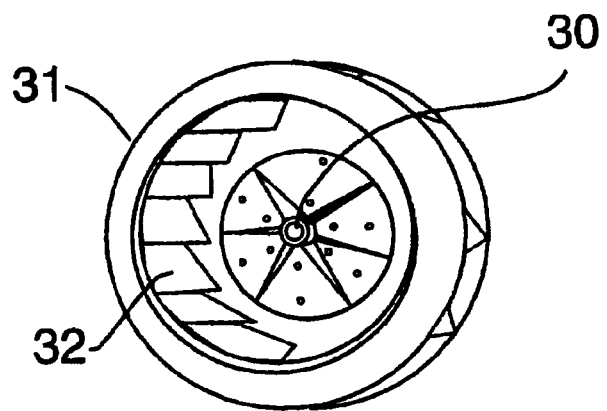

FIGS. 3A and 3B illustrate a high quality, high efficiency airfoil fan (22) for commercial and industrial applications. The fan (22) has been proven in thousands of installations and hundreds of diverse applications. The fan (22) has a unique adjustable discharge position wherein the housing (23) can be easily rotated to any one of four positions, the upright, the down, the left side or the right side. The fan (22) has a rugged heavy gauge steel housing (24), continuously welded, airtight with flange edges (25) for added stiffness. The fan (22) has removable bearing brackets (30) which are bolted to simplify bearing and shaft maintenance. The fan (22) has an adjustable motor base (26) which is prepunched for all popular motor frames (27). The compact units save floor space and are designed for mounting on top or either side of housing. The motor (28) varies from each application for the RPM, voltage requirements and noise levels. The fan (22) houses an efficient airfoil wheel (31) which is recognized as a most efficient fan blade (32) design. The fan can be made by many different manufacturers, such as Chicago Blowers and Air Foil Tech.

Figure 4:
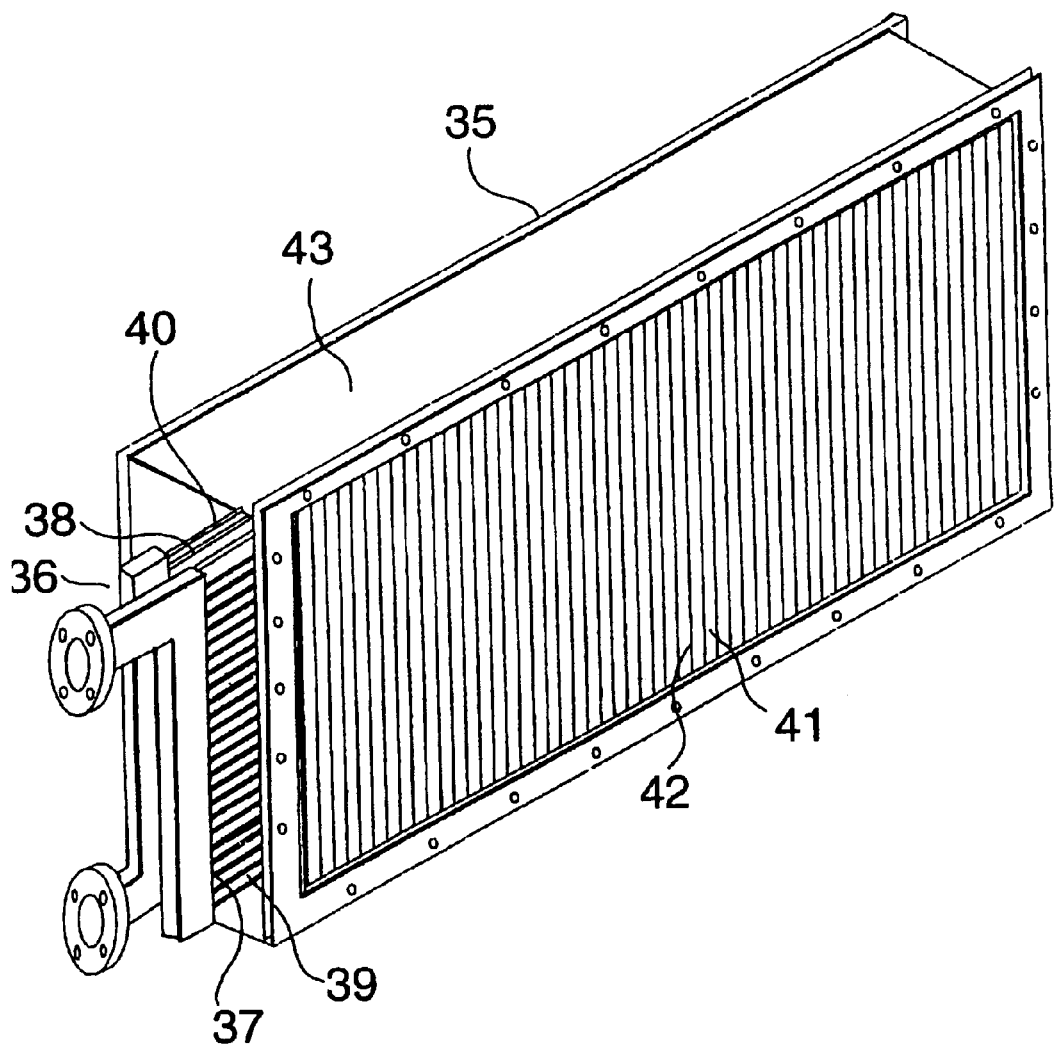

FIG. 4 illustrates typical coil (35) for both the condensing coil (20) and cooling coil (21). Cylindrical or rectangular in design, the headers (36) incorporate secure-seal round pipe (37) connection which allows fluid to pass through to the finned tubes (38). The header (36) is fabricated from commercial pipe. The pipe (39) is drilled on one side along the length with holes to match tube spacing (40). The tubes (38) are available in either ⅝" (16 mm) O.D. or 1" (25 mm) O.D. sizes in a wide range of materials including copper, copper nickel, carbon steel, admiralty red-brass, stainless steel, inconel and incalloy. The fins (41) are smooth with low air side resistance which allows the fin spacing (43) from 4 to 14 fins per inch (1.7 fins to 5.5 fins per cm). Each tube (38) is finned individually, so every tube (38) can expand or contract independently. The finned tubes (38) and headers (36) are loaded into a casing (47) sized to support all internal parts and to isolate these internal parts from external forces. There are many companies that manufacture coils which does not restrict the unit waiting on manufacturing.

FIG. 5 illustrates a unit (44) with two different types of saturated vapour nozzles mixing with the flue gas flow (45). The steam injection baffle (46) introduces a medium to high pressure steam, the flue gas passes through the cooling coil (47) and is introduced to a high pressure misting nozzle (48) which mixes a fine water droplet against the flue gas flow. After mixing with the high pressure water nozzles the flue gas passes through the condensing coil (49). The high pressure generated for the water nozzles is generated by a high pressure booster pump (50) then directed through a series of valves, safety valves, and gauges (51). The steam baffle (46) is controlled from a steam control valve to maintain a given application differing from project to project. If the owner of a plant has a medium to high pressure steam, then a simple high pressure water nozzle assembly would be used. On either application there are many manufacturers who manufacture these components, so in every application there will be different sequences of saturation vapour nozzles to meet the requirements of that project.

Figure 6A:
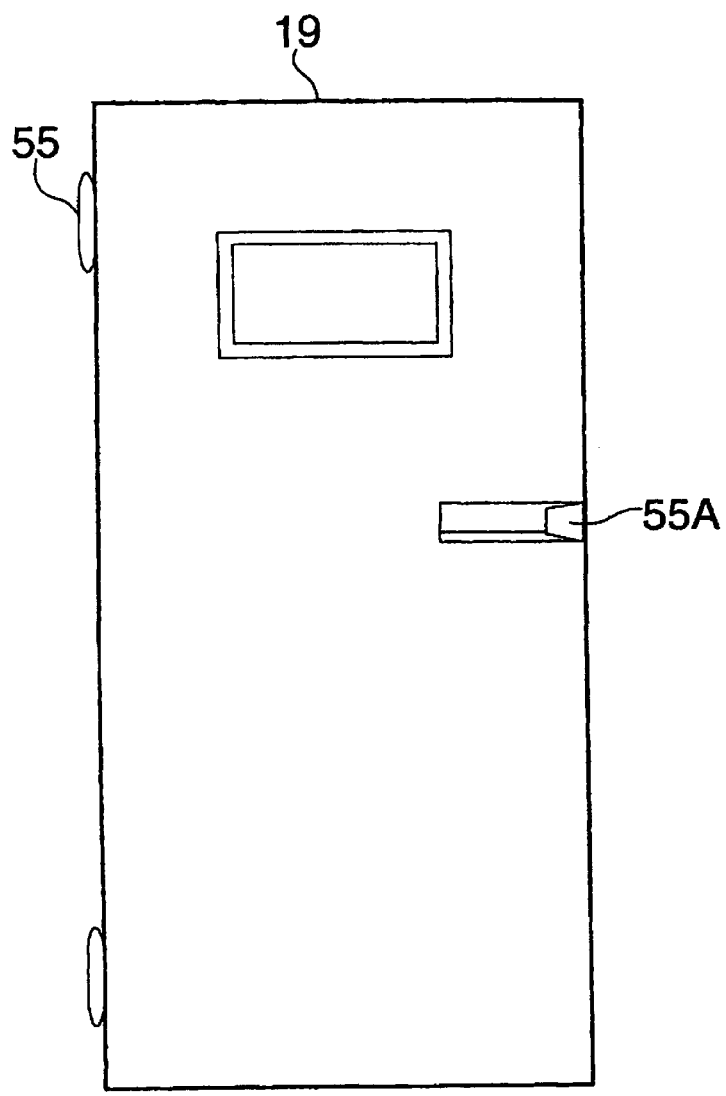
Figure 6B:
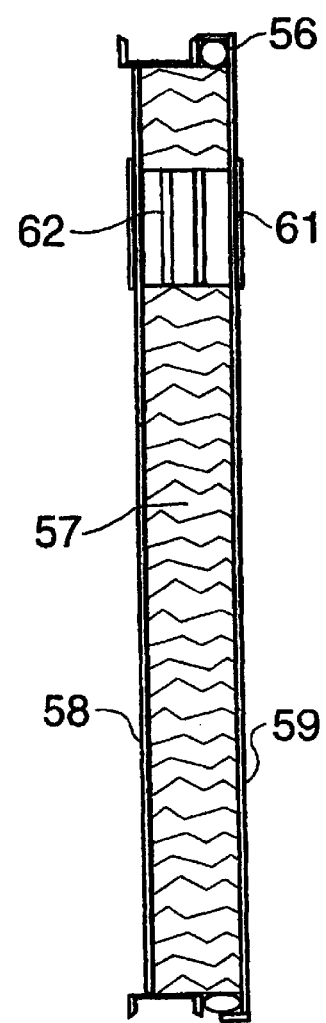

FIGS. 6A and 6B illustrate the access doors (19) of the unit which have an opening of approximately 24" (61 cm)

wide by 50" (127 cm) high. The access door (19) is mounted in a stainless steel angle frame (not shown) with two finish bright chrome door hinges (55) and a cam-type door latch (55A). As shown in FIG. 6B, the access door (19) has a single rubber gasket seal (56) to withstand abnormal temperature conditions. The door media (57) is thermal-acoustic, incombustible, shot-free fiber glass insulation. The interior skin (58) is constructed of 12 gauge (6.4 mm) 316 L stainless steel and the exterior skin (59) is constructed of 14 gauge (3.2 mm) galvanized sheet metal. The inspection windows (61) are approximately 12" (30.5 cm) wide by 12" (30.5 cm) high double glazed with wire reinforced (62) glass mounted in a channel and seal. Access to all the unit components requiring servicing and maintenance is from one side of the unit only.

Figure 7A:
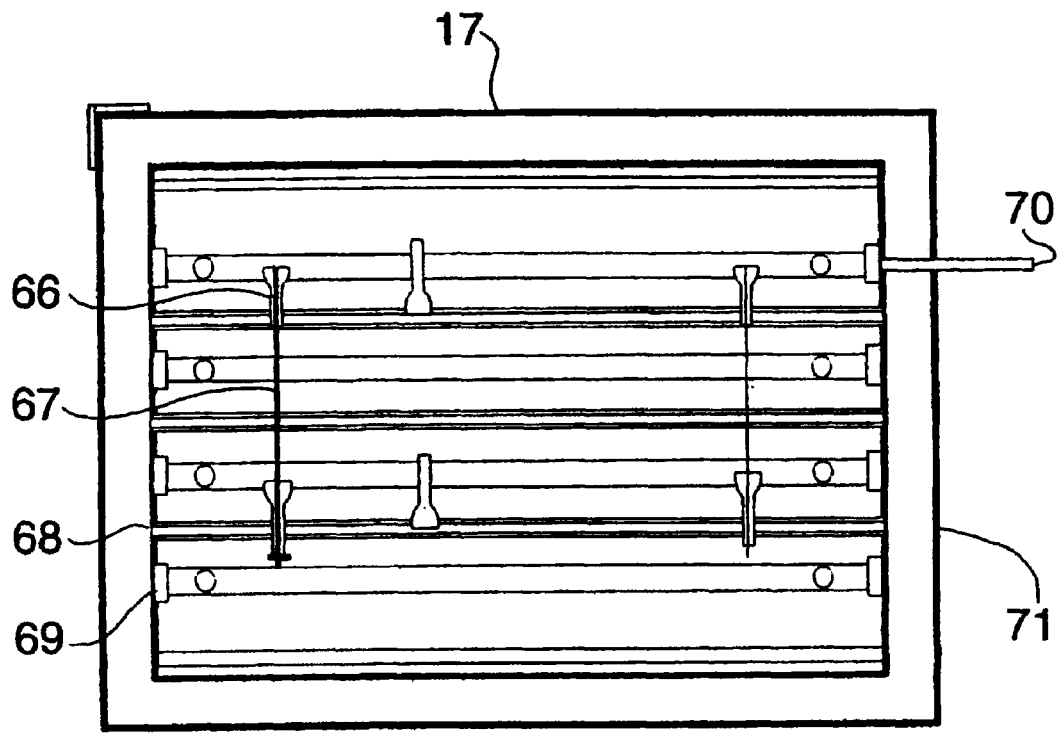
Figure 7B:
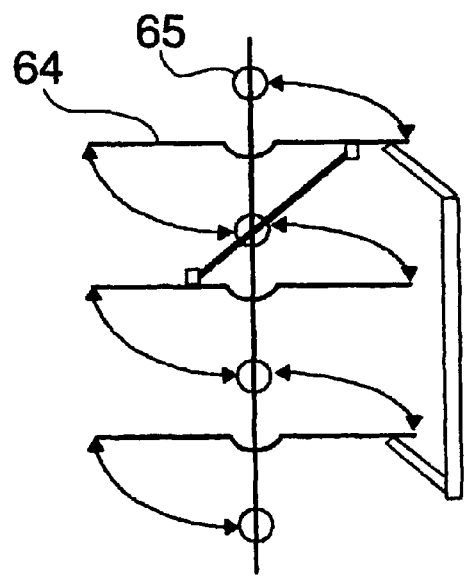

FIGS. 7A and 7B illustrate the discharge damper (17) of the unit. The discharge damper (17) is comprised of opposed stainless steel blades (64) constructed of 14 gauge (3.22 mm) stainless sheet metal. The bearings (65) are sealed for life lubricated, the damper linkage (66) and shafts (67) are zinc plated steel. The discharge damper seals (68) are replaceable, high temperature seals for both top and bottom mating edges, and stainless steel spring blade ends (69). A crank arm (70) is provided for connection to a damper actuator supplied by others upon installation of the unit. The damper frame (71) is constructed of 14 gauge (3.22 mm) stainless steel to withstand high moisture and temperature conditions. The discharge damper (17) has a low leakage that does not exceed 2% air flow at 10 m/s (2000 fpm) and 1 KPA (4") (10 cm) S.P. differential.

Series of Steps in Scrubbing Flue Gas and Removing Heat Therefrom through the Unit As illustrated in FIG. 8, the flue gas enters the unit by means of a square or round breeching (72) coming from the boiler. The flue gas immediately comes in contact with a cloud of steam or mist (73) where the steam or mist directional flow is going against the directional flow of the flue gas causing a pressure differential between the two flows. The steam or mist is produced by the steam manifold or a commonly known misting device (74), where the flue gas increases in moisture (humidity) to about 90% to 95% relative humidity at the same time maintaining a high flue gas temperature. This high RH (Relative Humidity), high temperature, and pressure differential causes the flue gas poc (product of combustion) to be absorbed into the fine water droplets (5 to 10 microns in diameter) maintaining a high temperature value at the same time converting the poc into a wet acid composition. The flue gas now comes into contact with a heat reclaim or cooling coil (21) where the hot flue gas water droplets exchange heat with the coolants within the hydronic coil circuit and cools down the hot moist flue gas. The flue gas passes through the cooling coil (21) and comes into contact with the second cloud of mist (75) at which point the directional flow of the mist is against the directional flow of the flue gas. The mist is produced by an array of misting devices (76) using cold water only. The flue gas after coming into contact with the second cloud of mist (75) will go at total saturation and cool the flue gas even more. The misting is designed to bring the cooled flue gas to saturation assuring that the condensing coil (20) will generate large water droplets on the surface of the condensing coil (20) by mixing water droplets within the receiving flue gas stream at a high mixing rate to assure that the entire cross section is homogeneous mixture without dry flue gas bypass. The flue gas then comes into contact with the condensing coil (20) causing a wet film of acid droplets to be collected on the surface of the coil. As more and more droplets are collected a stream is produced and forced to flow downward to the drain pan (77) where the collected liquids are directed out of the unit. The flue gas passes through the condensing coil (20) and is forced to go through the unit fan (22) where it is diffused with outside air and dispersed into the atmosphere through the discharge damper (17). The discharge dampers (17) are open when the boiler is operating and are closed to retain heat in the boiler when the boiler is not being fueled.

The flue gas process changes depending on the different types of removal that are to be achieved. For example, to remove $NO_x$ the sequence of events is different from the removal of $SO_x$.

$NO_x$ Removal

In order for the $NO_x$ to be removed by the unit it is required that $O_3$ be added to the flue gas stream to act as a reagent. Prior to entering the unit, $O_3$ is introduced to the flue gas through an $O_3$ aspirator (made by Enviro Energy Products) at 1.5 stoichiometric concentration. The introduction of $O_3$ into the flue gas stream causes the following reaction to occur:

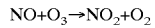
$$NO + O_3 \rightarrow NO_2 + O_2$$

This is required as $NO_2$ and not NO is required to convert the $NO_x$ into nitric acid for removal from the flue gas stream.

The seeded flue gas then enters the unit where it is uniformly fogged by a misting device. The introduction of fog ($H_2O$) to the flue gas causes the following reaction to occur:

$$3NO_2 + H_2O \rightarrow 2HNO_3 + NO$$

The flue gas then passes over a cooling coil, where the sensible heat is removed from the flue gas. The flue gas then passes through a second fogging stage required to increase the moisture content before passing through the unit's condensing coil. At the condensing coil the flue gas is cooled to saturation causing a water film to develop on the coil. This film is necessary to capture the $HNO_3$ to be removed in the waste water stream.

Figure 9:
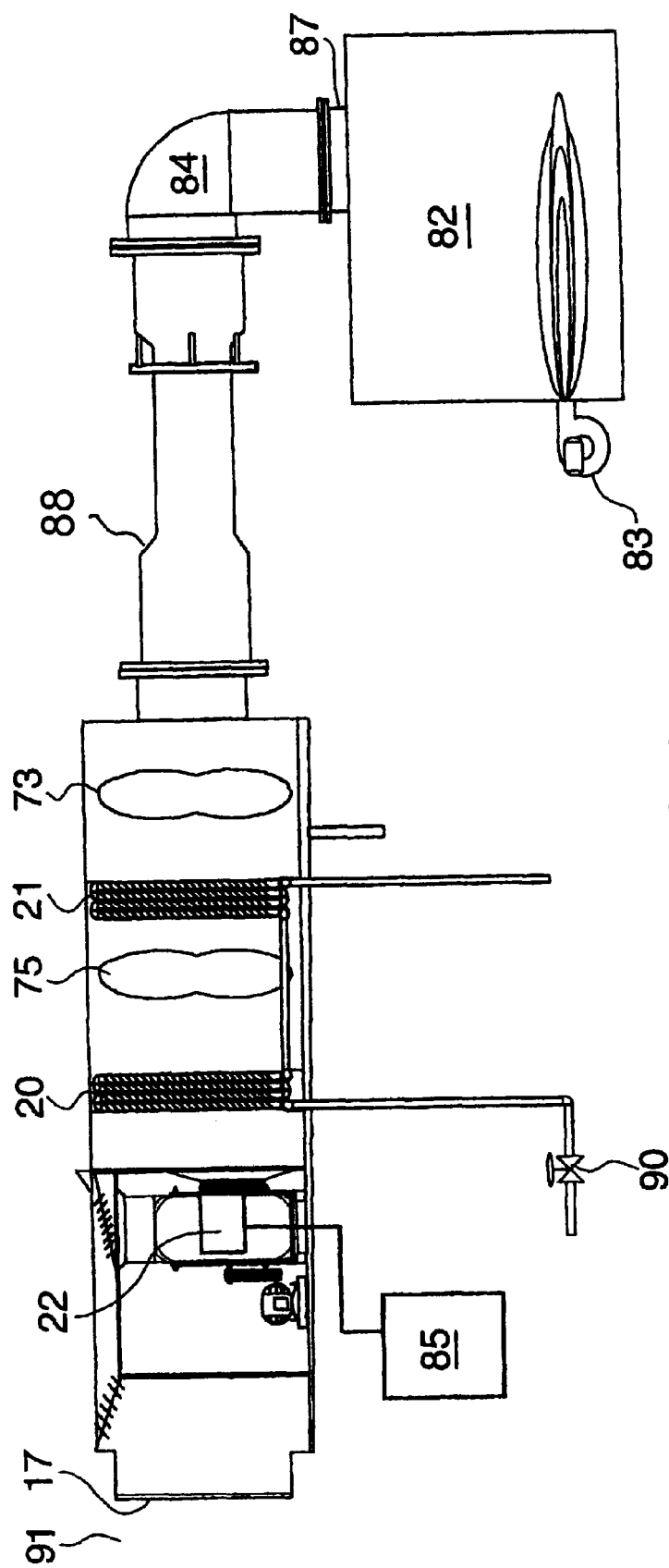

FIG. 9 illustrates, as an example of a typical $NO_x$ application, a 450 KW, horizontal, return flow, firetube boiler (82), with a conventional, pressure atomized, two stage burner (83). All the flue gas from the boiler is directed to the unit through a normal sized insulated duct (84). Sizes of duct vary from boiler to boiler. The control system (85) and variable speed fan (22) maintain a constant draft level at the boiler exit (87). The $O_3$ aspirator (88) is connected in the duct just after the flue gas exits the boiler. The $O_3$ aspirator (88) includes an arrangement of injection tubing and a static mixing chamber, where a mixture of ozone and oxygen are mixed with combustion products. Cooling water to the coils (20, 21) is simply provided from a common cold water supply line (90). At the exit of the unit (91) 100% of the treated combustion products are exhausted.

Figure 10:
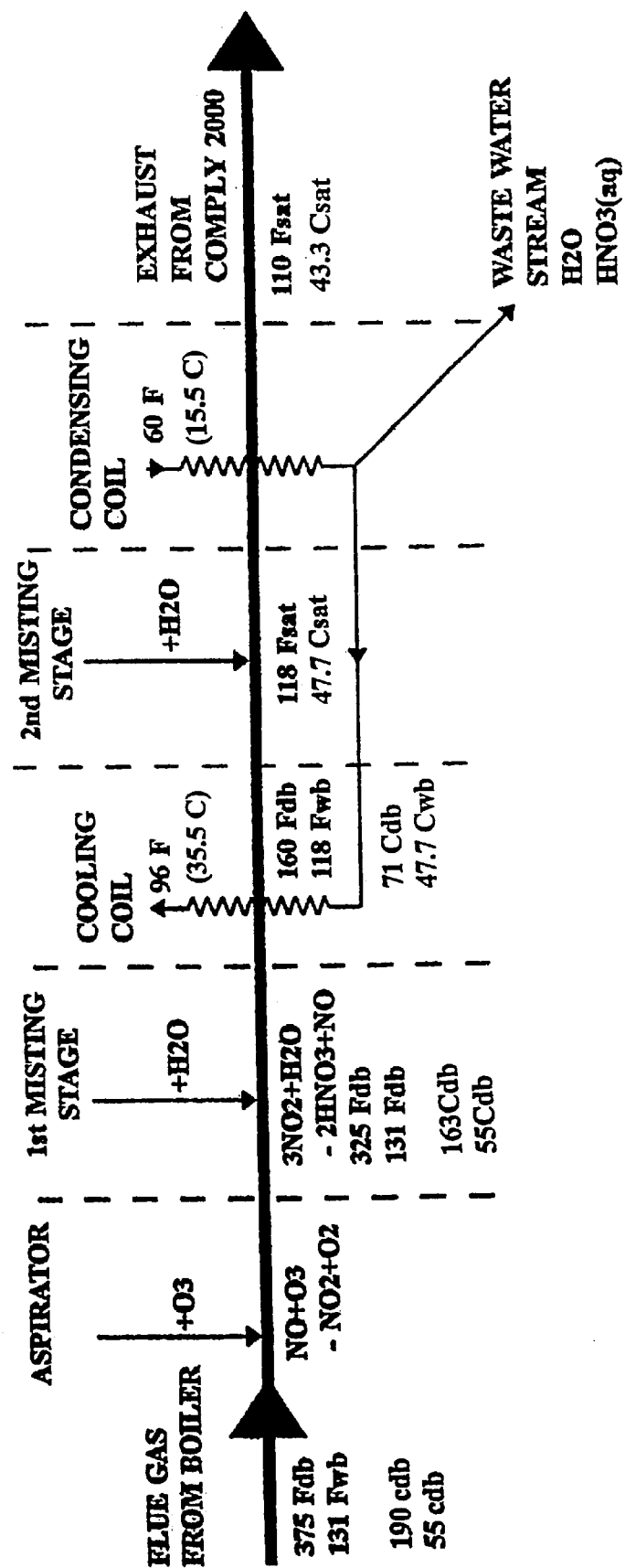

FIG. 10 represents a flow illustration of temperatures, and chemical changes going through the unit.

$SO_2$ Removal

The process which occurs is similar to the processes in the atmosphere which cause acid rain and other air pollution problems.

For $SO_2$ removal the same process occurs within the unit with two exceptions:

1. There is no need for an $O_3$ aspirator or ozone, and
2. A 2% concentration of $H_2O_2$ is added to the first misting stage causing the following reaction:

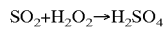
$$SO_2 + H_2O_2 \rightarrow H_2SO_4$$

Figure 11:
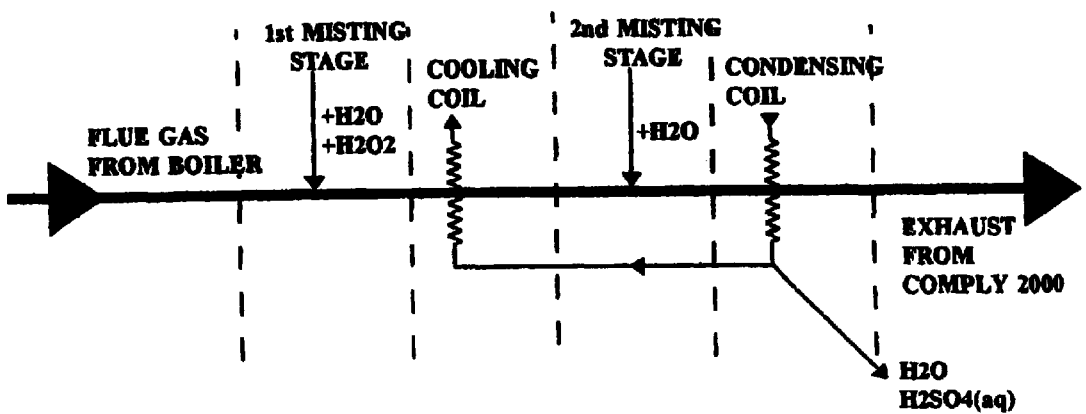

FIG. 11 represents a flow illustration of temperatures and chemical changes going through the unit.

All chemical reactions that occur within the unit of the present invention can be readily found in most chemistry books. As well, the cooling coil processes are proven engineering processes and are proven in industry and most thermodynamic books.

What is claimed is:

1. A process for removing contaminants from flue gas, process gas or air by flowing the flue gas, process gas or air through a first misting array, a first condensing coil, a second misting array, a second condensing coil, and a fan chamber, the process comprising: flowing the flue gas, process gas or air in a first direction, directing a first cloud of steam or mist of the first misting array comprised of droplets 5 to 10 microns in diameter in a second direction, substantially opposite to the first direction, against the flow of flue gas, process gas or air causing a pressure differential between the steam or mist and the flue gas, process gas or air, controlling a relative humidity of the first misting array to increase a relative humidity of the flue gas, process gas or air in the first misting array to 90 to 95% relative humidity but below saturation, flowing the flue gas, process gas or air having increased relative humidity through the first condensing coil, recovering heat from the first condensing coil, directing a second cloud of mist, formed of water only, at the flue gas, process gas or air from the second misting array, in a direction countercurrent to the direction of flow of the flue gas, process gas or air totally saturating the flue gas, process gas or air.

2. The process for removing contaminants from flue gas, process gas or air of claim 1, wherein $NO_x$ may be removed by aspirating $O_3$ into the flue gas, process gas or air prior to flowing the flue gas, process gas or air through the first misting array.

3. The process for removing contaminants from flue gas, process gas or air of claim 2 wherein $SO_x$ may be removed by mixing $H_2O_2$ with steam or water prior to introduction of the steam or water and $H_2O_2$ in the first misting array.

4. The process for removing contaminants from flue gas, process gas or air of claim 1 wherein $SO_x$ may be removed by mixing $H_2O_2$ with steam or water prior to introduction of the steam or water and $H_2O_2$ in the first misting array.

5. A heat recovery and pollution abatement unit for removing contaminants from flue gas, process gas or air comprising: a first misting array, a first condensing coil, a second misting array, a second condensing coil, a fan chamber and a treated gas outlet with discharge dampers, wherein the first misting array is operative to direct a cloud of steam or mist comprised of droplets 5 to 10 microns in diameter in a direction opposite to a flow of the flue gas, process gas or air, causing a pressure differential there between, and increase a relative humidity of the flue gas, process gas or air to 90 to 95% relative humidity but below saturation, and wherein the flow of flue gas, process gas or air is further directed through the first condensing coil and the second misting array, the second misting array operative to direct a second cloud of mist, formed from water only, in the direction opposite to the flow of the flue gas, process gas or air totally saturating the flue gas, process gas or air.

6. The heat recovery and pollution abatement unit for removing contaminants from flue gas, process gas or air of claim 5 further comprising an $O_3$ aspirator operative to aspirate $O_3$ into the flue gas, process gas or air before entry of the flue gas, process gas or air into the first misting array, for removing $NO_x$.

7. The heat recovery and pollution abatement unit for removing contaminants from flue gas, process gas or air of claim 6 further comprising a mixer operative to mix $H_2O_2$ with steam or water prior to introduction of the steam or water into the first misting array.

8. The heat recovery and pollution abatement unit for removing contaminants from flue gas, process gas or air of claim 5 further comprising a mixer operative to mix $H_2O_2$ with steam or water prior to introduction of the steam or water into the first misting array.

\* \* \* \* \*